(12) United States Patent
Krull et al.

(10) Patent No.: US 7,043,362 B2
(45) Date of Patent: May 9, 2006

(54) PDA WITH INTEGRATED ADDRESS BOOK AND ELECTRONIC MAP WAYPOINTS

(75) Inventors: Jay Dee Krull, Olathe, KS (US); Michael Childs, Olathe, KS (US); Matthew C. Burch, Lawrence, KS (US); Benjamin Jones, Olathe, KS (US); Paul McAlister, Overland Park, KS (US)

(73) Assignee: Garmin Ltd., (KY)

( * ) Notice: Subject to any disclaimer, the term of this patent is extended or adjusted under 35 U.S.C. 154(b) by 0 days.

(21) Appl. No.: 11/004,106

(22) Filed: Dec. 3, 2004

(65) Prior Publication Data

US 2005/0114021 A1 May 26, 2005

Related U.S. Application Data

(63) Continuation of application No. 10/032,032, filed on Dec. 21, 2001.

(51) Int. Cl.
*G01C 21/30* (2006.01)

(52) U.S. Cl. ............... 701/211; 701/208; 701/213; 342/995.14

(58) Field of Classification Search ........ 701/200–213; 340/988, 990, 995, 995.1, 995.18; 342/357.06–357.13, 342/357.1
See application file for complete search history.

(56) References Cited

U.S. PATENT DOCUMENTS

| | | | |
|---|---|---|---|
| 4,774,671 A | 9/1988 | Itoh et al. ............ 364/449 |
| 4,774,672 A | 9/1988 | Tsunoda et al. ............ 364/449 |
| 5,243,529 A | 9/1993 | Kashiwazaki |
| 5,528,248 A | 6/1996 | Steiner et al. ............ 342/357 |
| 5,537,324 A | 7/1996 | Nimura et al. ............ 364/449 |
| 5,542,105 A | 7/1996 | Finch et al. ............ 455/575.1 |
| 5,543,802 A | 8/1996 | Villevieille et al. ......... 342/357 |
| 5,640,689 A | 6/1997 | Rossi ............ 455/575.7 |
| 5,654,908 A * | 8/1997 | Yokoyama ............ 708/109 |
| 5,877,751 A | 3/1999 | Kanemitsu et al. ......... 345/173 |
| 5,938,721 A | 8/1999 | Dussell et al. ............ 701/211 |
| 5,943,018 A | 8/1999 | Miller ............ 343/702 |
| 5,946,687 A | 8/1999 | Gehani et al. |
| 5,948,040 A | 9/1999 | DeLorme et al. ............ 340/990 |
| 6,040,824 A | 3/2000 | Maekawa et al. ............ 345/173 |
| 6,140,970 A | 10/2000 | Ylijurva ............ 343/702 |
| 6,249,744 B1 | 6/2001 | Morita ............ 701/213 |
| 6,266,612 B1 | 7/2001 | Dussell et al. ............ 701/207 |
| 6,317,684 B1 | 11/2001 | Roeseler et al. ............ 701/202 |
| 6,317,686 B1 | 11/2001 | Ran ............ 701/117 |
| 6,317,687 B1 | 11/2001 | Morimoto et al. ............ 701/211 |

(Continued)

OTHER PUBLICATIONS

Cung, V., "An Efficient Implementation of Parallel A*", *CFPAR*, Montreal, Canada (1994), pp. 153-167.

(Continued)

*Primary Examiner*—Richard M. Camby
(74) *Attorney, Agent, or Firm*—David L Terrell

(57) ABSTRACT

Systems, devices and methods are provided for integrating GPS receiver technology into a PDA. The systems, devices and methods of the present invention integrate GPS capabilities with PDA functions, and in particular integrate a PDA address book function with an electronic map and GPS capabilities. One aspect provided herein is a method. In one embodiment, a location or feature is identified, and a Personal Digital Assistant (PDA) address book entry is associated with the location or feature. In one embodiment, a Personal Digital Assistant (PDA) address book entry is selected, and a location or feature is associated with the PDA address book entry. Other aspects are provided herein.

30 Claims, 16 Drawing Sheets

U.S. PATENT DOCUMENTS

| | | |
|---|---|---|
| 6,321,158 B1 | 11/2001 | DeLorme et al. ............ 701/201 |
| 6,353,414 B1 | 3/2002 | Jones et al. ................. 343/702 |
| 6,353,733 B1 | 3/2002 | Murray et al. ............. 455/90.1 |
| 6,407,709 B1 | 6/2002 | Hanshew .................... 343/702 |
| 6,411,899 B1 | 6/2002 | Dussell et al. ............. 701/211 |
| 6,415,138 B1 | 7/2002 | Sirola et al. ............... 455/90.1 |
| 6,490,435 B1 | 12/2002 | Ma et al. .................... 455/90.1 |
| 6,501,429 B1 | 12/2002 | Nakamura et al. .......... 343/702 |
| 6,518,927 B1 | 2/2003 | Schremmer et al. ........ 343/702 |
| 6,529,824 B1 | 3/2003 | Obradovich et al. ........ 701/208 |
| 6,573,868 B1 | 6/2003 | Johnson et al. ............. 343/702 |
| 6,731,753 B1 | 5/2004 | Park et al. ............. 379/433.07 |
| 2002/0013815 A1 | 1/2002 | Obradovich et al. ........ 709/204 |
| 2002/0052689 A1 | 5/2002 | Yamashita et al. .......... 701/211 |

OTHER PUBLICATIONS

"An optimal pathfinder for vehicles in real-world digital terrain maps", http://www.nease.net/jamsoft/shortestpath/pathfinder/4.html, 11 pages, (1999).

"Informed Search Methods", *Artificial Intelligence, A Modern Approach*, Prentice Hall, Inc., pp. 92-115, (1995).

"Real-Time Vehicle Routing in Dynamic and Stochastic Urban Traffic Networks", http://www.gpu.srv.ualberta.ca/lfu/research.htm, pp. 1-3, (1997).

Ahuja, R., et al., "Faster Algorithms for the Shortest Path Problem", *Journal of the Association for Computing Machinery*, 37(2), pp. 213-223, (1990).

Cung, V., et al., "An Efficient Implementation of Parallel A", *CFPAR*, Montreal, Canada, pp. 153-167, (1994).

Fredman, N., et al., "Fibonacci heaps and their uses in improved network optimization algorithms", *Journal of the ACM*, 34(3), 2 pages, (1987).

Fu, L., "Heuristic Shortest Path Algorithms and their Potential IVHS Applications", *Proceedings of the Fourth University of Alberta—University of Calgary, Joint Graduate Student Symposium in Transportation Engineering*, pp. 83-109, (1995).

Ikeda, T., et al., "A Fast Algorithm for Finding Better Routes by AI Search Techniques", *Vehicle Navigation and Information Systems Conference Proceedings*, pp. 291-296, (1994).

Kaindl, H., et al., "Memory-Bounded Bidirectional Search", *Proceedings of the 12th National Conference on Art*, AAAI Press, Seattle, WA, pp. 1359-1364, (1994).

Laporte, G., "The Vehicle Routing Problem: An overview of exact and approximate algorithms", *European Journal of Operational Research*, 59, pp. 345-358, (1992).

Myers, B., "Data Structures for Best-First Search", http://www4.ncsu.edu/jbmyers/dsai.htm, pp. 1-6, (1997).

Ronngren, R., et al., "Parallel and Sequential Priority Queue Algorithms", *ACM Transactions on Modeling and Computer Simulation*, 7(2), pp. 168-172, 198, 199 (1997).

Stout, B., "Smart-Moves: Intelligent Pathfinding", *Gamasutra*, http://www.gamasutra.com/features/programming/080197/pathfinding.htm, pp. 1-11, (1997).

Wai, L., et al., "Comparative Study of Shortest Path Algorithm for Transport Network", *USRP Report 2*, http://www.compnus.edu.sg/leonghoe/USRPreport-txt.html, pp. 1-10, (1999).

Zhan, F.B., "Three Fastest Shortest Path Algorithms on Real Road Networks: Data Structures and Procedures", *Journal of Geographic Information and Decision Analysis*, 1(1), http://www.geog.uwo.ca/gimda/journal/voll.1/Zhan.htm, 11 pages, (1997).

Zhao, Y., et al., "An Adaptive Route-Guidance Algorithm for Intelligent Vehicle Highway Systems", *American Control Conference, Boston, MA*, Department of Electrical Engineering and Computer Science, The University of Michigan, pp. 2568-2573, (1991).

\* cited by examiner

```
┌─────────────────────────────────┐
│ Address List        ▽ All       │      310
├─────────────────────────────────┤     ╱
│                                 │
│ Abrams, Liz    650-454-6121W ▯▢─┼─320
│ Adams, Ben     405-552-7211W ▯▢ │
│ Connelly, joe  913-339-9645W ▯──┼─318
│ Dillion, Kelly 816-647-3120W────┼─316
│ Keller, Patrick 573-882-8211H ▢ │
│         ↖            ↖       ╲316│
│         312          314        │
│                                 │
│                                 │
│ Look Up: ........  (  New  ) ⇕  │
└─────────────────────────────────┘
              FIG. 3
```

```
┌─────────────────────────────────┐
│ Address View       ▽ Unfiled    │      410
├─────────────────────────────────┤     ╱
│ Patrick Keller ▯─416            │
│                                 │
│ Home:  573-882-8211             │
│ Work:  573-445-7575             │
│                                 │
│ 5324 Blackbob                   │
│ Columbia, MO 65203              │
│                                 │
│                       420       │
│ ( Done ) ( Edit ) ( New  )      │
│ ( Goto ) (Waypoint)( Map )  ⇕   │
└───↑─────────↑──────↑────────────┘
   414       412    418   FIG. 4
```

510

| Address Edit | ▽ Unfiled |

Last Name: Keller
First Name: Patrick
Title:
Company:
Home: 573-882-8211
Work: 573-445-7575
Fax:
Other:
E-mail:
Address: 5324 Blackbob
City: Columbia
State: MO ( Done ) ( Details... ) ( New )
( Goto ) ( Waypoint ) ( Map )   514   512   518

FIG. 5

```
┌─────────────────────────────────┐
│  Address            ▽ All       │
├─────────────────────────────────┤
│                                 │
│ Doe, John     123-456-7890W ▯ ⟜─┼── 1312
│ Johnson, Steve 456-123-7890W ▯ │
│                                 │
│                                 │
│                                 │
│                                 │
│                                 │
│                                 │
│ Look Up: ........  ( New )      │
└─────────────────────────────────┘
```

FIG. 13

```
┌─────────────────────────────────┐
│ Address View  [📶]⊕ WWWWW...    │
├─────────────────────────────────┤
│ John Doe                        │
│                                 │
│ CFO                             │
│ Acme International, Inc.        │
│                                 │
│ Work:    123-456-7890           │
│ Home:    987-654-3210           │
│                                 │
│ 2929 S. 29th Street             │
│ Omaha, NE 29292                 │
│                                 │
│ (Done)(Edit)(Location)       ⇕  │
└─────────────────────────────────┘
```

FIG. 14

| Address View | iiiiiiiiiiiiii |
|---|---|

IIIII

Custom 1:    C1

Custom 2:    C2

Custom 3:    C3

Custom 4:    C4

IIIII

[Done] [Edit] [Location]

FIG. 15

| Address View | WWWWW... |
|---|---|

Omaha, NE 29292
Acme International, Inc.

Custom 1:    C1

Custom 2:    C2

Custom 3:    C3

Another

[Done] [Edit] [Location]

FIG. 16

PDA WITH INTEGRATED ADDRESS BOOK AND ELECTRONIC MAP WAYPOINTS

This is a CIP of 10/032,032 filed Dec. 21, 2001.

FIELD OF THE INVENTION

The present invention relates generally to Personal Data Assistants (PDAs) and, more particularly, to PDAs with Global Positioning System (GPS) features.

BACKGROUND OF THE INVENTION

PDAs are small, substantially hand-held computers that are used for storing, manipulating and retrieving data. One example of a PDA is the Palm Pilot® manufactured by 3Com Corporation. PDAs provide a variety of functions, such as an electronic day planner, an address book, a to do list, and a memo pad.

Electronic navigation devices employing Global Positioning System ("GPS") receivers are known. The GPS includes a plurality of satellites that are in orbit about the Earth. The orbit of each satellite is not necessarily synchronous with the orbits of other satellites and, in fact, is likely asynchronous. The GPS receiver device receives spread spectrum GPS satellite signals from the various satellites. The spread spectrum signals continuously transmitted from each satellite utilize a highly accurate frequency standard accomplished with an extremely accurate atomic clock. Each satellite, as part of its data signal transmission, transmits a data stream indicative of that particular satellite. The GPS receiver device acquires spread spectrum GPS satellite signals from at least three satellites to calculate its two-dimensional position by triangulation. Acquisition of an additional signal, resulting in signals from a total of four satellites, permits the GPS receiver device to calculate its three-dimensional position. In this manner, an electronic navigation device employing a GPS receiver has the ability to accurately compute the position of the device in real time, even as the device moves. One example of an electronic navigation device is the eMAP portable electronic map manufactured by Garmin International.

Plug-in GPS receiver modules for PDAs are known. There are problems associated with various plug-in GPS receiver modules and PDAs. One problem is that a PDA with a plug-in GPS receiver module is cumbersome to handle and use. Two separate devices must be handled. Additionally, the plug-in GPS receiver module and the PDA do not function together to provide integrated PDA features.

Therefore, there exists a need for a PDA that incorporates GPS receiver technology within a single module, and that further integrates GPS capabilities into PDA functions such that the GPS capable PDA is not cumbersome to handle or to use.

SUMMARY OF THE INVENTION

The present invention addresses problems with integrating GPS receiver technology into a PDA, and will be understood by reading and studying the following specification. The systems, devices and methods of the present invention integrate GPS capabilities with PDA functions. In particular, the systems, devices and methods of the present invention integrate a PDA address book function with an electronic map that has GPS capabilities.

One aspect provided herein is a method. In one embodiment, a location for an electronic map is identified, and a Personal Digital Assistant (PDA) address book entry is associated with the location. In one embodiment, electronic map feature data associated with the location is identified, and the PDA address book entry is pre-filled using the electronic map feature data associated with the location. According to one method embodiment, a PDA address book entry is selected, and a location for an electronic map is associated with the PDA address book entry.

One aspect provided herein is a data structure for use by a PDA for linking PDA address book entries and electronic map locations and/or features. According to one embodiment, the data structure includes a field representing a latitude, and a field representing a longitude. In one embodiment, the field representing a latitude and the field representing a longitude includes a data string contained within a custom field in a PDA address book entry. According to one embodiment, the data structure further includes a field representing a symbol associated with the waypoint, and a field representing an altitude.

One aspect provided herein is a PDA device with an integrated electronic map and address book. According to one embodiment, the PDA device includes a processor and a memory adapted to communicate to the processor. Address book data and electronic map data are contained within the memory. In one embodiment, the electronic map data is contained in a map data cartridge. The PDA device is adapted to associate a waypoint for the electronic map with a PDA address book entry.

These and other aspects, embodiments, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 3 is a representation of an address list screen for one PDA embodiment according to the present invention;

FIG. 4 is a representation of an address view screen for one PDA embodiment according to the present invention;

FIG. 5 is a representation of an address edit screen for one PDA embodiment according to the present invention;

FIG. 13 is a representation of an Address List Screen for one PDA embodiment according to the present invention;

FIG. 14 is a representation of an Address View Screen for one PDA embodiment according to the present invention;

FIG. 15 is a representation of custom fields for the Address View Screen of FIG. 14 when information exists in the Custom 4 Field that is not in a prescribed format;

FIG. 16 is a representation of custom fields for the Address View Screen of FIG. 14 when no information exists in the Custom 4 Field or if the information is in a prescribed format;

DETAILED DESCRIPTION OF THE INVENTION

In the following detailed description of the invention, reference is made to the accompanying drawings which form a part hereof and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to systems, devices and methods for integrating GPS receiver technology into a PDA and for integrating capabilities associated with GPS and electronic map technologies with PDA functions. The present invention integrates a PDA address book function with an electronic map and GPS capabilities. The present invention is capable of associating an address with a position such as that provided by latitude and longitude coordinates for two dimensions, and an altitude value for three dimensions. A position is capable of being identified from an address, and an address is capable of being identified or estimated from a location.

Figure 1A:
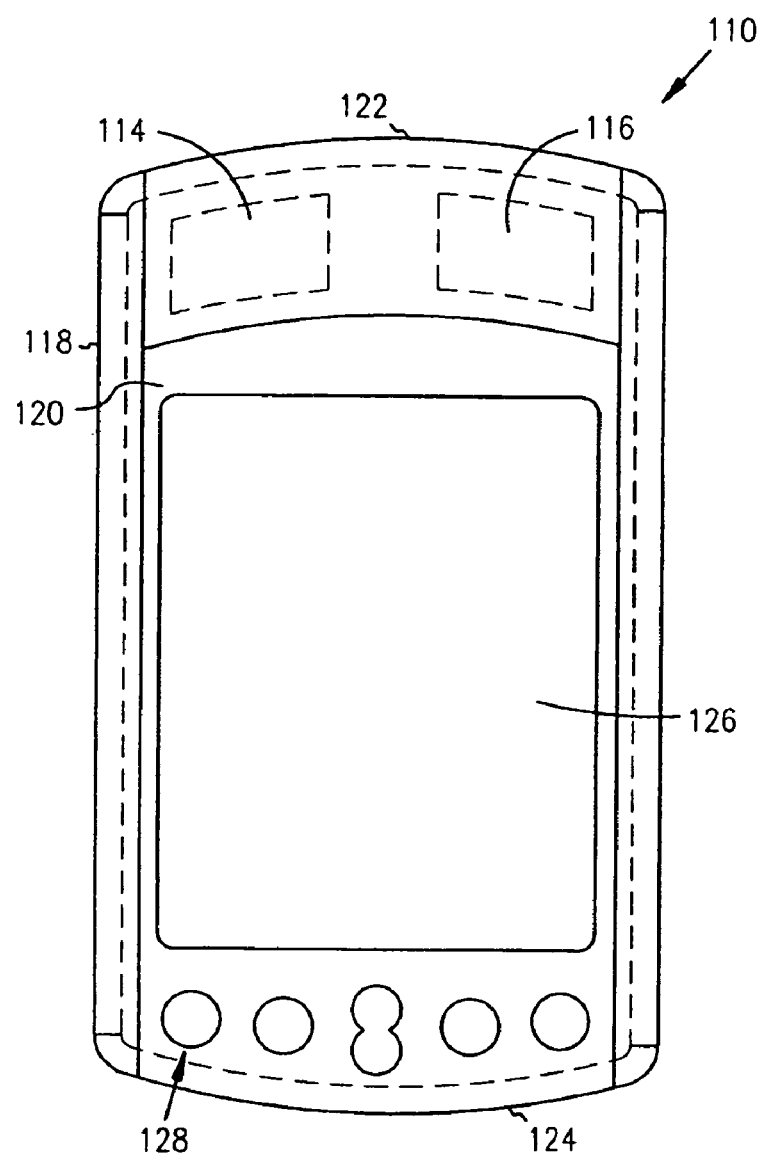
FIG. 1A is a front view of a PDA with integrated GPS receiver according to the present invention.
Figure 1B:
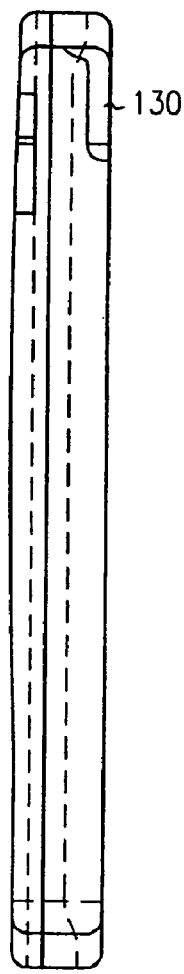
FIG. 1B is a side view of the PDA shown in FIG. 1.
Figure 1C:
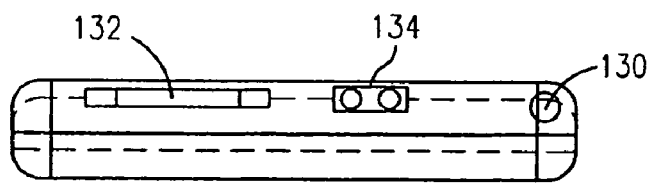
FIG. 1C is a top end view of the PDA shown in FIG. 1.

FIGS. 1A–1C illustrate views for a personal digital assistant (PDA) with integrated Global Positioning System (GPS) receiver according to the teachings of the present invention. The GPS integrated PDA operates with an operating system (OS) such as, for example, the well-known Palm or Pocket PC operating systems, or the currently lesser-used Linux OS.

As shown in the front view of FIG. 1A, the GPS integrated PDA 110 includes a GPS antenna, illustrated in this embodiment as an internal integrated GPS patch antenna 114 contained within a housing 118. As one of ordinary skill in the art will understand, the antenna can include other antenna designs such as a helical GPS antenna. The invention is not so limited. The housing 118 in the illustrated embodiment is generally rectangular with a low profile and has a front face 120 extending from a top end 122 to a bottom end 124. Mounted on front face 120 is a display screen 126, which is touch sensitive and responsive to a stylus 130 (shown stored in the side view of FIG. 1B) or a finger touch. FIGS. 1A–1C illustrate the stylus 130 nested within housing 118 for storage and convenient access in a conventional manner.

The embodiment shown in FIG. 1A illustrates a number of control buttons, or input keys 128 positioned toward the bottom end 124. The invention, however, is not so limited and one of ordinary skill in the art will appreciate that the input keys 128 can be positioned toward the top end 122 or at any other suitable location.

The end view of FIG. 1C illustrates a map data cartridge bay slot 132 and headphone jack 134 provided at the top end 122 of the housing 118. Again, the invention is not so limited and one of ordinary skill in the art will appreciate that a map data cartridge bay slot 132 and headphone jack 134 can be provided at the bottom end 124, separately at opposite ends, or at any other suitable location.

One embodiment of the GPS integrated PDA 110 has the capability to wirelessly communicate with other PDAs or with other systems using a variety of wireless communication technology, such a satellite, radio frequency, microwave frequency and infrared communication, and the like. One embodiment of the GPS integrated PDA 110 includes a cellular transceiver 116 contained in the housing 118. The cellular transceiver is used in cellular communication technology, such as time division multiple access (TDMA), frequency division multiple access (FDMA), code division multiple access (CDMA), global system for mobile communications (GSM), and the like. According to various embodiments, the wireless communication includes digital and analog signals. According to various embodiments, these signals are modulated, encrypted and/or compressed signals as may be desirable for the communication technology.

Figure 2:
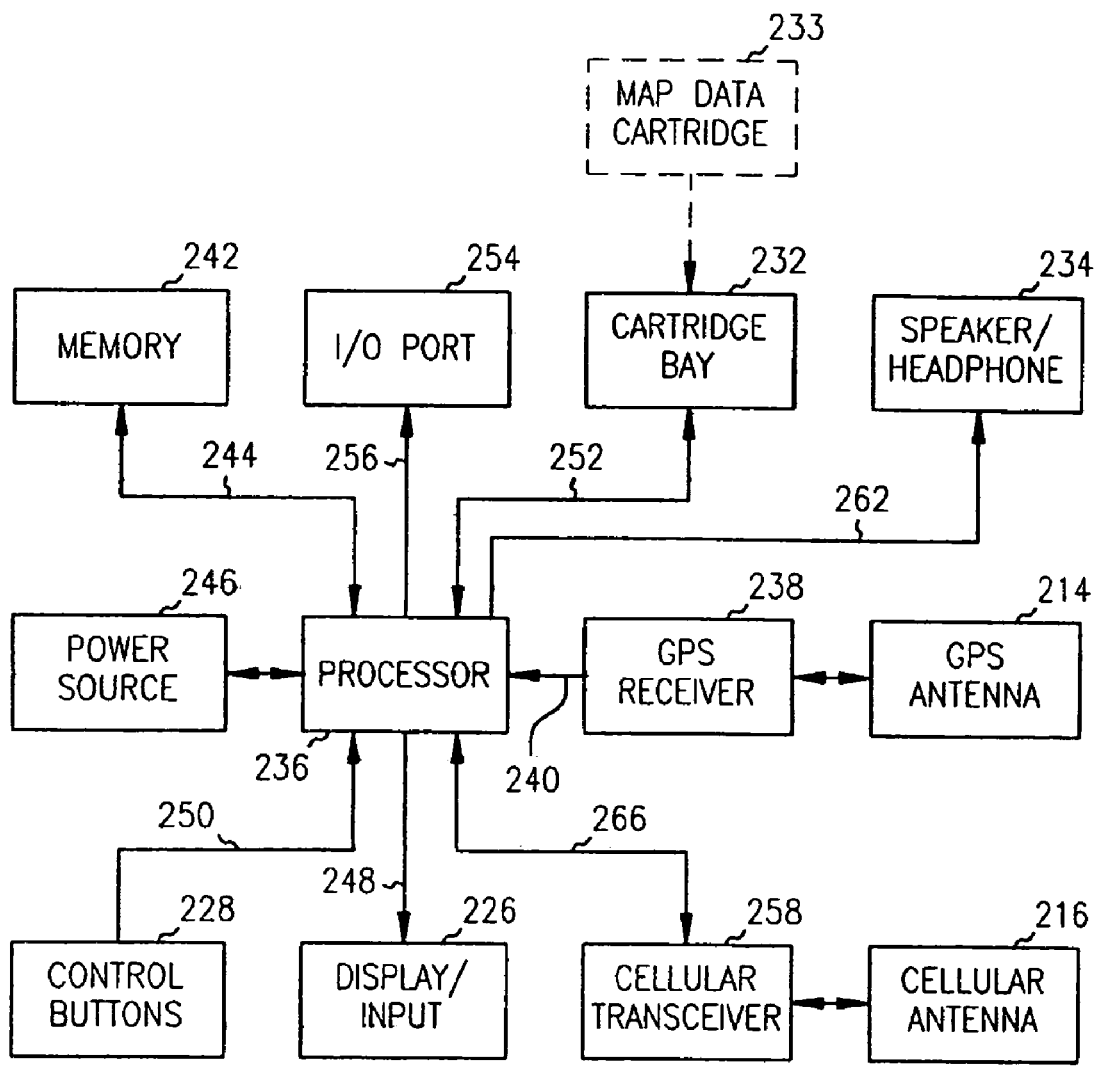
FIG. 2 is a block diagram of components in one PDA embodiment.

FIG. 2 is a block diagram of components in one PDA embodiment. In one embodiment, the electronic circuit for a PDA with an integrated GPS receiver includes a processor 236 that interacts with an operating system (such as PalmOS; Pocket PC) that runs selected software depending on the intended use of the PDA. Processor 236 is coupled with memory 242 such as RAM via line 244, and power source 246 for powering the electronic components of the PDA. The processor 236 communicates with a touch sensitive display screen 226 via data line 248. The electronic circuit further includes two other input sources that are connected to the processor 236. Control buttons 228 are connected to processor 236 via line 250 and a map data cartridge 233 inserted into cartridge bay 232 is connected via line 252. A conventional USB or serial I/O port 254 is connected to the processor 236 via line 256.

The PDA is integrated with GPS capabilities using a GPS receiver 238. A GPS antenna 214 is connected to the GPS receiver 238, and the GPS receiver 238 is connected to the processor 236 via line 240. The GPS antenna 214 is a patch antenna in one embodiment and a helical antenna in another embodiment One embodiment of the PDA with an integrated GPS receiver includes cellular communication capabilities. A cellular antenna 216 is connected to a cellular transceiver 258, which is connected to the processor 236 via line 260. Processor 236 is connected to the speaker/headphone jack 234 via line 262. According to one embodiment, the PDA 210 includes an infrared port (not shown) coupled to the processor 236 that is capable of being used to beam information from one PDA to another.

The processor 236 accesses some form of computer-readable media Computer-readable media include any available media that is accessible by the processor. By way of example and not limitation, computer-readable media include computer storage media and communications media. Computer storage media, or memory, includes volatile and non-volatile, removable and non-removable media implemented in any method or technology for storage of information such as computer-readable instructions, data structures, program modules or other data. Communication media specifically embodies computer-readable instructions, data structures, program modules or other data in a modulated data signal such as a carrier wave or transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of any of the above would also be included within the scope of computer-readable media.

FIG. 3 is a representation of an Address List Screen for one PDA embodiment according to the present invention. The Address List screen, denoted generally by reference number 310, is presented on the display screen 126 of FIG. 1 when the PDA electronic address book software application is conventionally selected and run. A list of names 312 is displayed along with phone numbers 314, a designator 316 to indicate a work (W) or home (H) phone number, and an attached electronic note indicator 318. Also shown is a waypoint indicator 320 which indicates that the address associated with corresponding name has been saved as a waypoint for use in electronic map or GPS applications.

Waypoints are used in electronic map or GPS applications as intended destinations, points of interest and to build routes, for example. A waypoint, in general, can be any identified location such as coordinates or an electronic map feature. An electronic map feature is a location that is associated with other information such as, for example, a name, address, telephone number, and the like, for the location. Waypoints are used herein to identify a location or electronic map feature that is associated with a PDA address book entry.

FIG. 4 is a representation of an Address View Screen for one PDA embodiment according to the present invention. This Address View Screen is displayed when the name "Patrick Keller" is conventionally selected in the Address List Screen 310 of FIG. 3. The Address View Screen is denoted generally by reference numeral 410. Selection of the Waypoint button 412 stores an electronic GPS coordinate corresponding to the displayed address identified by the displayed name. One embodiment of the GPS integrated PDA is capable of storing five hundred or more waypoints in memory. Selecting the Goto button 414 displays a course from the present location of the PDA to the waypoint associated with the displayed address on the Address View Screen 410. In one embodiment in which a waypoint has not been stored for the displayed address, selecting the Goto button 414 automatically stores an associated waypoint and then displays an electronic map showing the course from the present location of the PDA to the displayed address. In another embodiment in which a waypoint has not been stored for the displayed address, the Goto button 414 is not available or is hidden. Indicator 416 is displayed to indicate that a waypoint has been stored for this address. As will be shown below in connection with FIGS. 5 and 6, selecting the Map button 418 displays an electronic map with the location of the address shown in screen 410. Selecting the Edit button 420 displays an Address Edit Screen.

FIG. 5 is a representation of an Address Edit Screen for one PDA embodiment according to the present invention. The Address Edit Screen is denoted generally by reference numeral 510, and is displayed when the Edit button 420 is selected in the Address View Screen 410 of FIG. 4. Selection of the Waypoint button 512 stores an electronic GPS coordinate corresponding to the displayed address identified by the displayed name. Selecting the Goto button 514 displays a course from the present location of the PDA to the waypoint associated with the displayed address on the Address Edit Screen 510. In one embodiment in which a waypoint has not been stored for the displayed address, selection of the Goto button 514 automatically stores an associated waypoint and then displays an electronic map showing the course from the present location of the PDA to the displayed address. In another embodiment in which a waypoint has not been stored for the displayed address, the Goto button 514 is not available or is hidden. As will be shown below in connection with FIG. 6, selecting the Map button 518 displays an electronic map with the location of the address shown in screen 510. According to various embodiments, the PDA is capable of providing navigational routes and guidance, such that the location of the address is not necessarily shown on the map at a given time.

Figure 6:
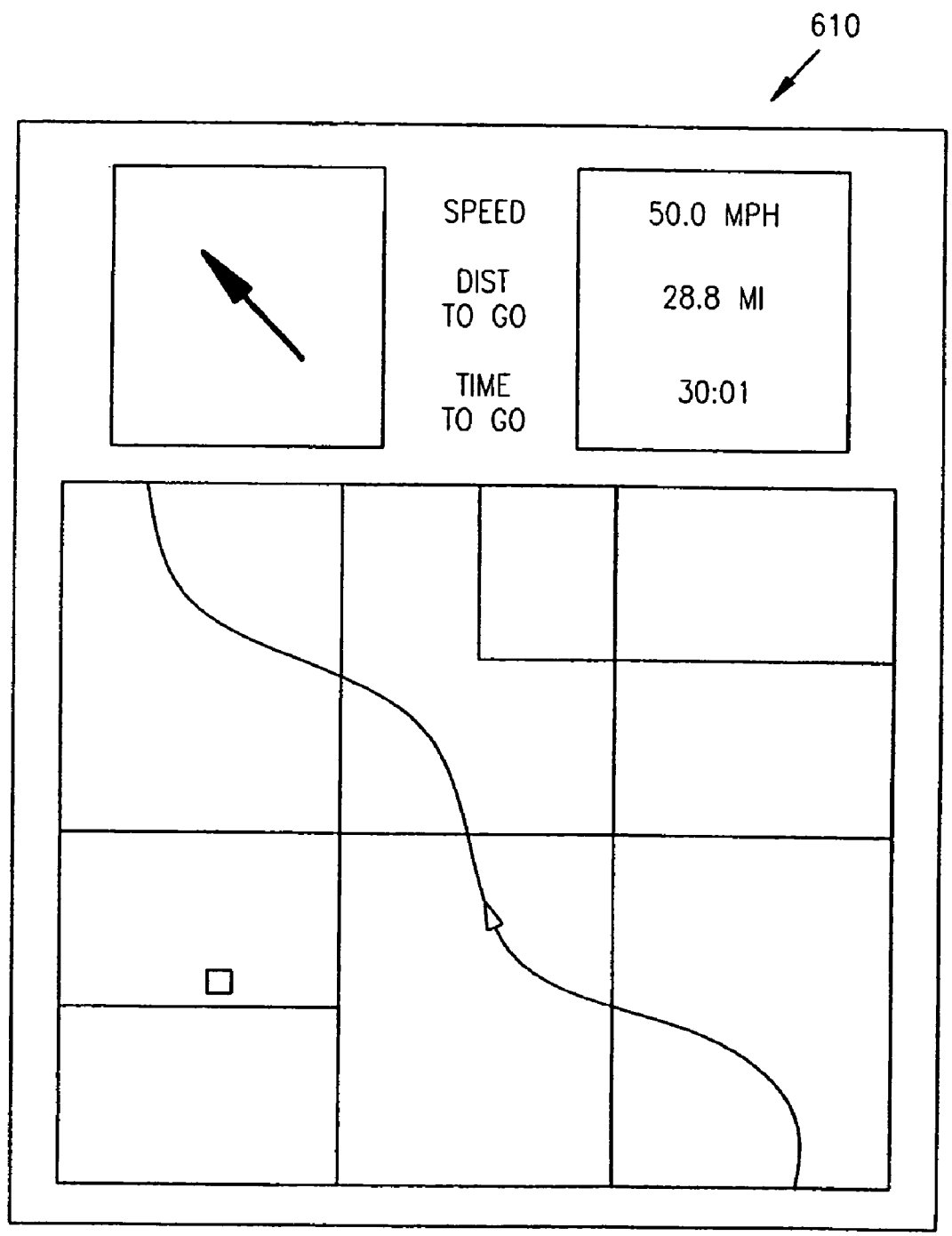
FIG. 6 is a representation of a map screen for one PDA embodiment according to the present invention.

FIG. 6 is a representation of a Map Screen for one PDA embodiment according to the present invention. The Map Screen is denoted generally by reference numeral 610, and is displayed when the Map button 418 is selected in the Address View Screen 410 of FIG. 4, or when the Map button 518 is selected in the Address Edit Screen 510 of FIG. 5. The Map Screen of the GPS integrated PDA provides functions and features of a conventional portable navigational device such as the eMap manufactured by GARMIN International, for example. Integration of the map features of a portable navigation device with a PDA allows sharing of address information between the address book and the electronic map software applications.

For example, when the PDA displays a map, a location displayed on the PDA screen is capable of being selected using a stylus or other selection means to mark a waypoint or to display an address corresponding to the selected location. In one embodiment, if there is no name stored with this address, Address Edit Screen 510 shown in FIG. 5 is displayed to prompt entry of a name in the name fields and other data.

In one embodiment of a GPS integrated PDA with cellular communication capabilities, the exact position of one PDA is capable of being displayed on another PDA unit or electronic device that has cellular communication capabilities and has the capability of receiving and displaying location information. The NavTalk device manufactured by GARMIN International is one such device that has the capability of receiving and displaying such location information.

Figure 7:
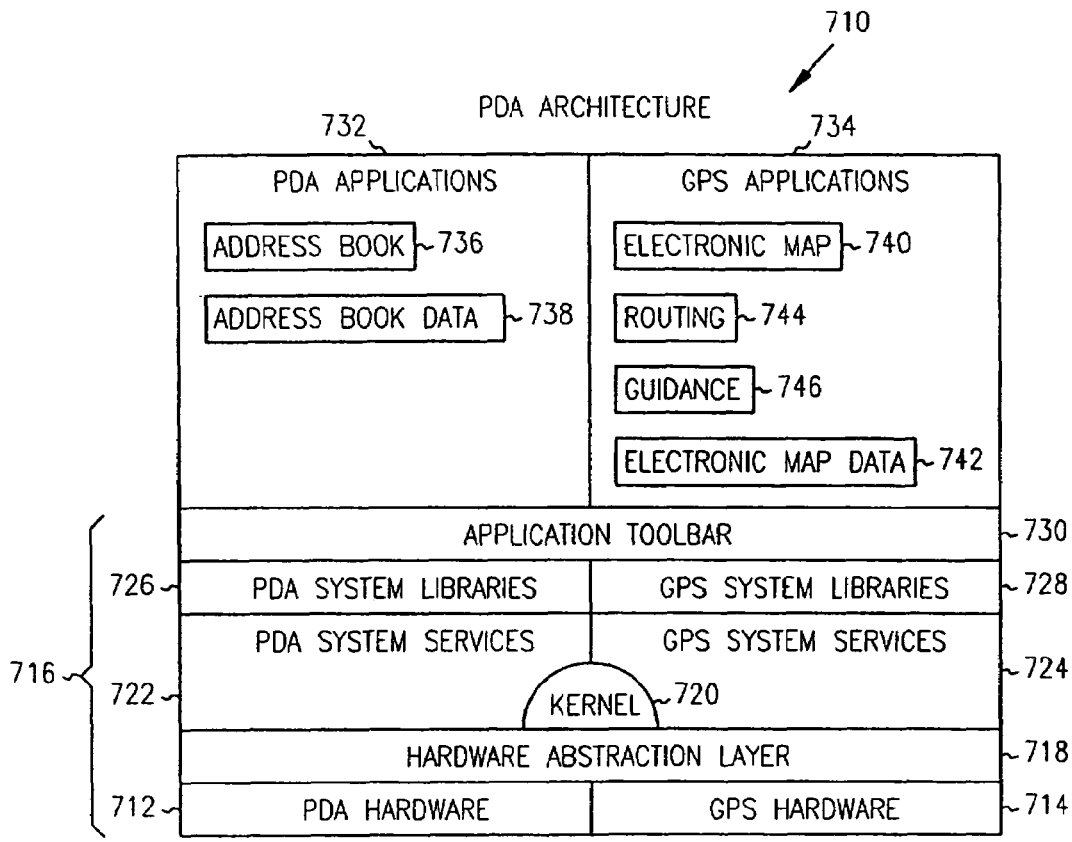
FIG. 7 is a representation of a PDA architecture according to the present invention.

FIG. 7 is a representation of a PDA architecture according to the present invention. The PDA architecture is denoted generally by reference numeral 710. The PDA architecture includes PDA hardware 712, and is capable of including third party, OEM hardware such as GPS hardware 714. An operating system 716 operates on the hardware.

One of ordinary skill in the art will understand the operation and function of an operating system. A brief overview is provided here to assist the reader. One definition of an operating system is software that provides hardware control and user interaction. An operating system can be viewed as being divided into a loader, a kernel and utilities. These portions of the operating system are not illustrated, as such, in the PDA architecture 710 of FIG. 7. A responsibility of the loader is, upon power up, loading the kernel of the operating system into memory and transferring control to the kernel. Tasks performed by the kernel of the operating system include controlling hardware, such as hardware initializations, and controlling some software initializations like internal data structures. The kernel also is able to set predetermined entry points to trusted code. The utilities are the outer layer of the operating system, which depend on kernel entry points to do hardware accesses. The utilities invoke other programs and transfer control to them. The operating system 716 is shown generally in FIG. 7 as those components in the PDA architecture 710 that provide hardware control.

FIG. 7 illustrates various layers on other layers. One of ordinary skill in the art will understand how these layers are related with each other to provide an operable PDA. In the illustration shown in FIG. 7, a hardware abstraction layer 718 is illustrated on the hardware 712 and 714, and a kernel 720 is illustrated on the hardware abstraction layer 718. Both conventional PDA system services 722 and third party, OEM system services such as GPS services 724 are positioned on the hardware abstraction layer 718 on the kernel 720. PDA system libraries 726 are illustrated on the PDA system services 722 and third party, OEM system libraries 728 such as GPS system libraries are illustrated on the GPS system services 724. An application toolbar 730 is illustrated on the PDA system libraries 726 and the GPS system libraries 728. Various PDA applications 732 and GPS applications 734 can be launched from the application tool bar 730. PDA applications 732 include applications such as an address book application 736 and associated address book data 738. GPS applications include applications such an electronic map application 740 and associated electronic map data 742, a routing application 744, and a guidance application 746. These GPS applications are capable of determining the real time position of a GPS receiver, i.e. the PDA device. According to one embodiment, the electronic map data 742 is provided on a map data cartridge such as the map data cartridge 233 shown in FIG. 2. According to one embodiment, the electronic map data 742 is provided, at least in part, by a server through a wireless communication channel. According to one embodiment, the calculations associated with routing and guidance applications are provided, at least in part, by a server and are communicated to the PDA through a wireless communication channel. One of ordinary skill in the art will recognize that the integration of GPS capabilities into the PDA architecture 710 can be accomplished at the hardware level 714, the system services level 724, the system library level 728, and/or the applications level 734.

Figure 8:
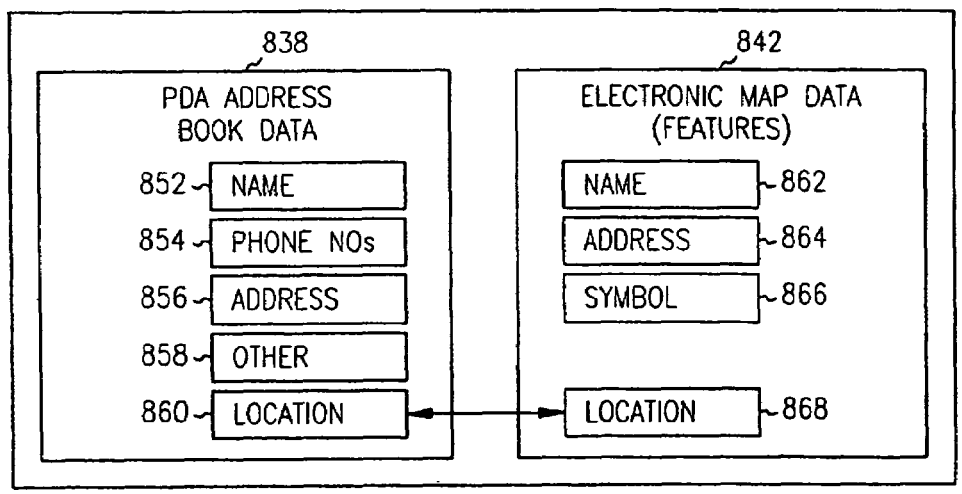
FIG. 8 is a representation of linked PDA address book data and electronic map data according to the present invention.

FIG. 8 is a representation of linked PDA address book data and electronic map data according to the present invention. PDA address book data 838 includes a number of fields, such as a Name Field 852, a Phone Number field 854, an Address Field 856, Other or Custom Fields 858, and the like. A custom field is capable of being implemented to store a variety of information as desired by the user. Data contained in these fields are grouped together and associated with a PDA address book entry. In one embodiment, electronic map data 842 includes fields such as a Name Field 862, an Address Field 864, a Symbol Field 866 associated with a location, location coordinates 868, and the like. As used herein, one definition of a waypoint is a location associated with a Name Field and a Symbol Field. For example, a waypoint can be used to calculate routes or to store location information for an electronic map. Additionally, waypoints are capable of being displayed on electronic maps using representative symbols to designate markers or turns. The present invention associates PDA address book entries and the electronic map data. That is, the present invention is capable of associating a position (via latitude and longitude coordinates, for example) to an address book entry such that a position can be determined from an address and an address can be determined from a position. In one embodiment, the present invention adds location information into a location field 860 in the PDA address book entry, and uses this location field to associate the address book entry to the electronic map data. In one embodiment, the location field 860 is a modified Other or Custom Field 858 found in a conventional PDA address book, and a data string that identifies a location is stored in the Custom Field 858.

Figure 9:
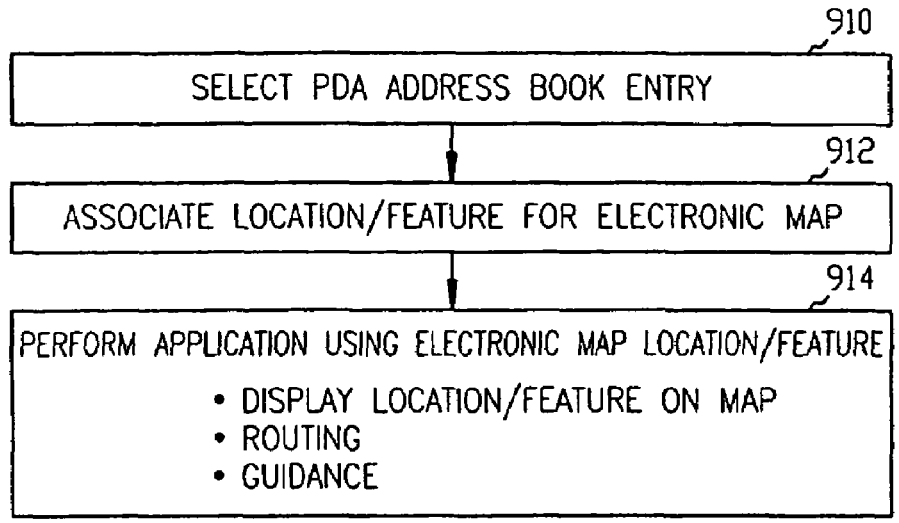
FIG. 9 is a flow diagram of one method embodiment according to the present invention.

FIG. 9 is a flow diagram of one method embodiment according to the present invention. According to this embodiment, a PDA address book entry is selected at 910, and at 912 a location/feature for an electronic map is associated with the selected PDA address book entry. Locations/features and any symbols associated therewith are able to be associated with existing PDA address book entries and with newly formed PDA address book entries. At 914, an application is performed using a waypoint that is formed by associating the electronic map location/feature with the PDA address book entry. These applications include, by way of example, displaying the waypoint on the electronic map, calculating a route to the waypoint, displaying a route to the waypoint, and providing navigational guidance to the waypoint. In one embodiment, displaying a waypoint on the electronic map includes displaying an appropriate symbol for the waypoint, such as a red cross for a medical facility, or any other suitable symbol as appropriate for the given waypoint.

According to various embodiments, the navigational guidance includes visual guidance that provides turn arrows, text instructions and the like, and voice guidance that provides spoken navigational instructions to reach the way point. The following co-pending, commonly-assigned U.S. patent applications relate to guidance and are herein incorporated by reference: "Navigation System, Method and Device with Automatic Next Turn Page," Ser. No. 10/029,917, filed Dec. 21, 2001 and "Navigation System, Method and Device With Voice Guidance," Ser. No. 10/029,732, filed Dec. 21, 2001. Accordingly to one embodiment, the electronic map data is provided to a PDA on a map data cartridge. According to one embodiment, the electronic map data is provided to the PDA, at least in part, by a server through a wireless communication channel between the PDA and the server. According to one embodiment, the calculations associated with routing and guidance applications are provided to the PDA, at least in part, by a server and are communicated to the PDA through a wireless communication channel between the PDA and the server.

Figure 10:
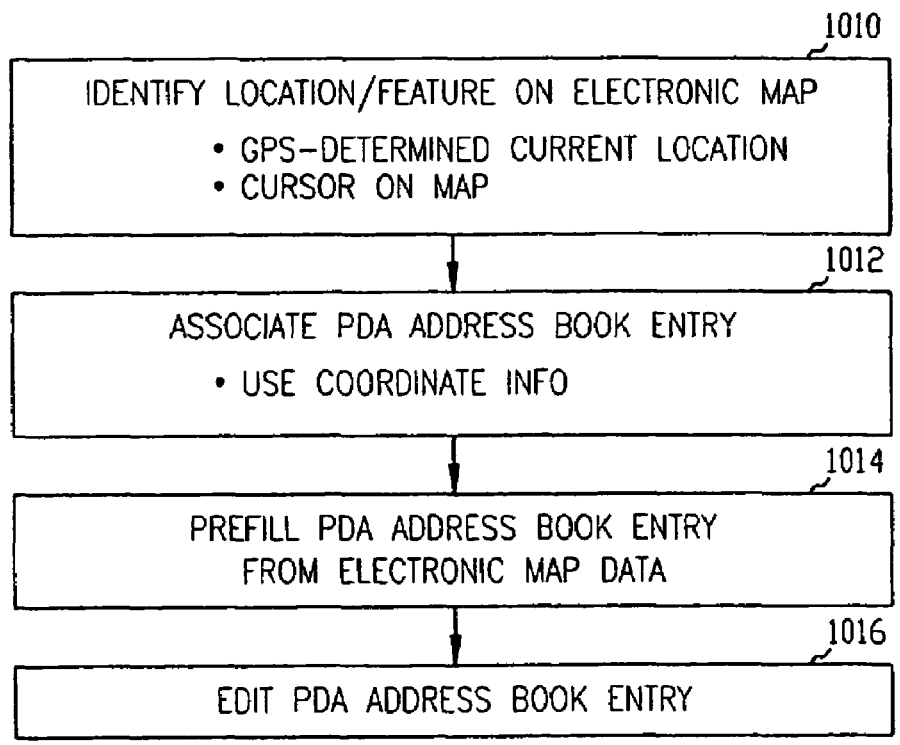
FIG. 10 is a flow diagram of one method embodiment according to the present invention.

FIG. 10 is a flow diagram of one method embodiment according to the present invention. According to this embodiment, a location/feature on an electronic map is identified at 1010. A PDA address book entry is associated with the identified location/feature at 1012 to form a waypoint for the PDA. According to one embodiment, at 1014 the PDA address book entry is pre-filled from electronic map data associated with the waypoint identified previously at 1010. The pre-filled PDA address book entry is capable of being edited at 1016. In one embodiment, the location/feature is identified by a GPS-determined position. That is, the GPS receiver receives signals from GPS satellites, from which the current position of the PDA is determined. One of ordinary skill in the art will understand that navigational routing and guidance are capable of being performed using the GPS receiver to determine the position of the PDA with respect to waypoints. In one embodiment, the location/feature is identified by positioning a cursor on an electronic map. In one embodiment, the PDA address book entry to be associated with the identified location/feature is an existing PDA address book entry. In one embodiment, the PDA address book entry to be associated with the identified location/feature is newly created.

One of ordinary skill in the art will understand, upon reading and comprehending this disclosure, that the PDA device of the present invention is capable of performing a number of integrated GPS/address book functions. For example, a PDA user who is in a restaurant is able to use the GPS functions to identify the location of the restaurant for future use, and perhaps even the name and address if that information is available in the map data. Rather than create and store a separate waypoint for the electronic map, a PDA address book entry is capable of being created for that restaurant. This PDA address book entry is capable of being pre-filled with data already contained within the electronic map. According to the present invention, as will be described in more detail below with respect to FIG. 11, addresses are able to be estimated from address ranges contained in the electronic map. The PDA user is able to edit the pre-filled data to provide a new or more descriptive name, or to provide a precise address. The PDA user also is able to add data to the PDA address book entry, such as a phone number, comments and a desired waypoint symbol. The PDA user is able to retrieve the PDA address book entry created from the location/feature, locate the restaurant on the electronic map, and receive navigational routing and guidance to the restaurant. As is clear upon reading and comprehending this disclosure, other integrated GPS/address book functions are available. As such, the above-described restaurant example should not be read to limit the invention.

Figure 11:
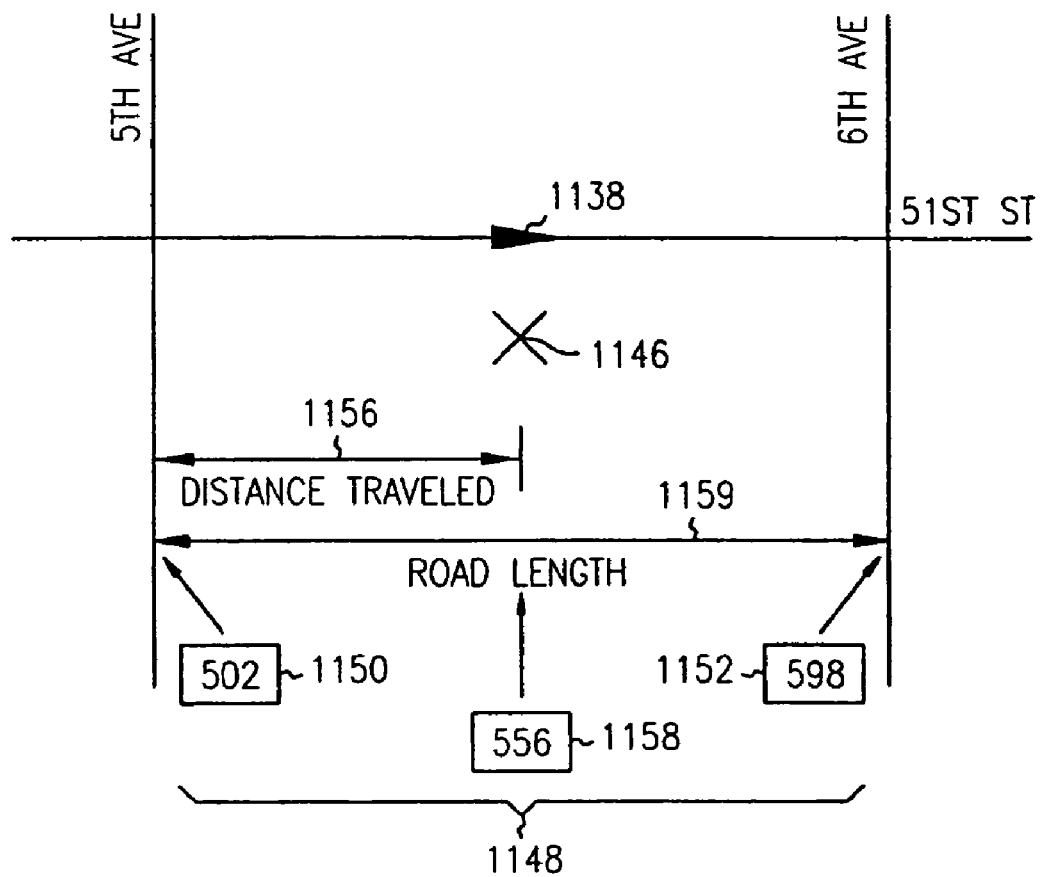
FIG. 11 illustrates one embodiment for estimating an address within an address range.

FIG. 11 illustrates one embodiment for estimating an address within an address range. In one embodiment, estimated address are used to pre-fill a PDA address book entry. According to this embodiment, the position 1146 of the PDA 1138 is determined via the GPS device methods described above. In FIG. 11, for example, it is determined that the PDA 1138 is traveling on 51st Street. An address range 1148 is associated with the position of the PDA 1138. In the illustrated example, it is determined that the address number range 1148 is from "502" at 1150 to "598" at 1152. The distance traveled from the beginning of the address number range (502 51st Street) at 1150 to the position 1146 of the PDA 1138 is determined. An address is estimated based on the address number range 1148, the length 1154 of the road associated with the address range 1148, and the distance 1156 from the beginning of the address number range 1148 at 1150 to the position 1146 of the PDA 1138. An estimated address number 1158 is derived based on this information. In the illustrated example, the estimate proximate address 1158 is estimated to be "556". According to some local rules or standards, the address ranges on one side of the road are odd and on the other side of the road are even. The PDA 1138 is able to determine whether the desired estimated address number falls within the odd or even address range. Although this address is an estimation, it is noted that this estimation often will be enough to find or re-find the subject of the PDA address book entry. In the above-described restaurant example, the estimated address is close enough to travel back to and find the restaurant without the assistance of GPS guidance and the like.

FIG. 12A–12E illustrate, in various levels of detail, an embodiment of a data structure for use by a PDA for linking PDA address book entries and locations/features such as electronic map features. A location is identified by coordinates in one embodiment. A feature includes additional data associated with the coordinates, such as a name, phone number, address and the like. The data structure is denoted generally by reference numeral 1210. In one embodiment, the data structure 1210 is stored as a data string in a custom field of a PDA address book entry. The data string references or identifies a location, which is used to associate the PDA address book entry to the electronic map. The data string is capable of being stored in a Custom Field of a PDA address book entry to link the PDA address book entry to an electronic map, such as a map with GPS capabilities.

Figure 12A:
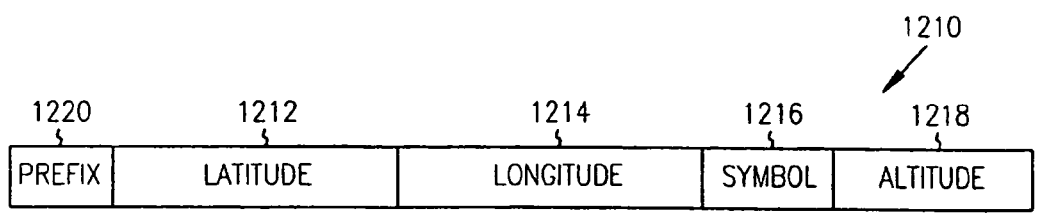
FIG. 12A–12E illustrate, in various levels of detail, an embodiment of a data structure for use by a PDA for linking PDA address book entries and locations/features such as electronic map features.

Referring to FIG. 12A, the data structure includes a field 1212 representing a latitude and a field 1214 representing a longitude. The latitude and longitude fields are sufficient to associate the PDA address book entry to a 2-dimensional position on an electronic map. One embodiment of the data structure includes a field 1216 representing a symbol. The symbol is displayed on the map as a representation of a waypoint. For example, a red cross symbol is capable of being used to represent a medical facility, and an airplane symbol is capable of being used to represent an airport. One embodiment of the data structure 1210 includes a field 1218 representing an altitude. A 3-dimensional position is capable of being determined based on the latitude, longitude and altitude. One embodiment of the data structure 1210 includes a field 1220 representing a prefix which can, for example, be used to identify a type and format of the data string. The present invention is not limited to a particular order of these fields in the data string.

Figure 12B:
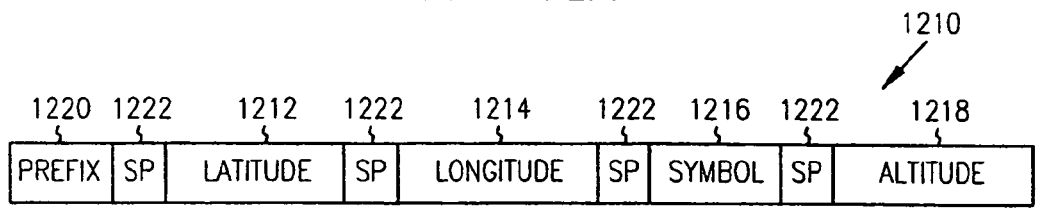

Referring to FIG. 12B, one embodiment of the data structure includes spaces 1222 between fields that make up the data string or structure. Other delimiting marks, such as commas or semicolons, may be used in place of spaces 1222. The present invention is not limited to the use of delimiting marks, or to any particular type of delimiting marks.

Figure 12C:
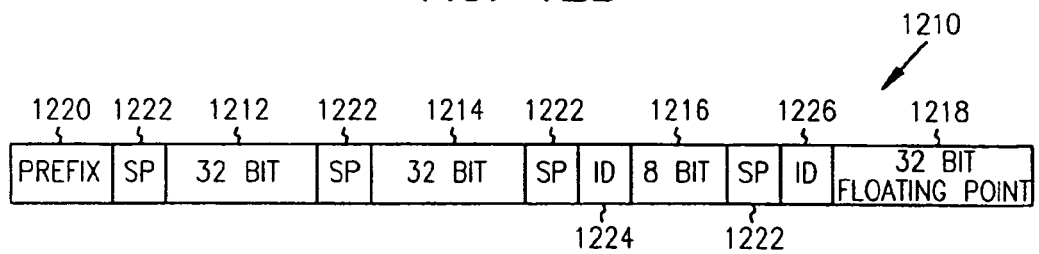

Referring to FIG. 12C, according to one embodiment, both the field 1212 representing a latitude and the field 1214 representing a longitude are 32 bit fields. The field 1216 representing a symbol is an 8 bit field, and the field 1218 representing the altitude is a 32-bit IEEE floating point field. An ID character 1224, such as the character B, is associated with the field 1216 representing a symbol and an ID character 1226, such as the character A, is associated with the field 1218 representing an altitude. The present invention is not so limited, however.

Figure 12D:
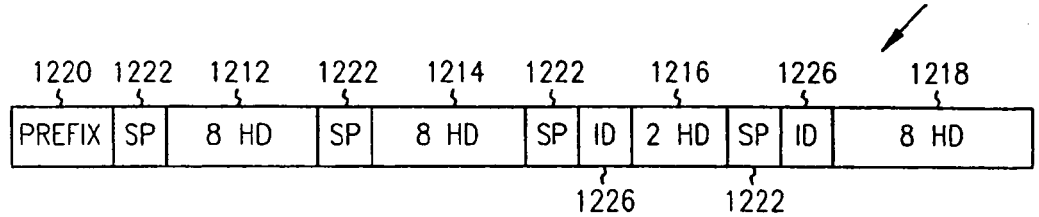

Referring to FIG. 12D, according to one embodiment, hexadecimal values are used in various fields. Hexadecimal values are designated in the figures as "H.D." The 32-bit fields 1212, 1214 and 1218 in FIG. 12C are represented using an 8 character hexadecimal value ($2^{32}=16^8$). The 8-bit field 1216 in FIG. 12C is represented using a 2 character hexadecimal value ($2^8=16^2$).

Figure 12E:
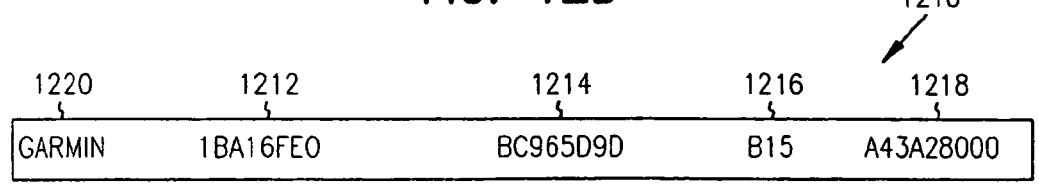

Referring to FIG. 12E, an example of the data string is shown. The data string is "GARMIN 1BA16FE0 BC965D9D B15 A43A28000". "GARMIN" is contained in the field 1220 representing a prefix; "1BA16FE0" is contained in the field 1212 representing a latitude; "BC965D9D" is contained in the field 1214 representing a longitude; "B15" is contained in the field 1216 representing a symbol; and "A43A28000" is contained in the field 1218 representing an altitude. The data string of this example provides a coded representation of 38.86 deg N, 47.40 deg W, symbol identifier 21, and 325 meters altitude. This data string is capable of being stored in a Custom Field in an PDA address book entry, and provides a location that is capable of being used to link the PDA address book entry to an electronic map.

FIGS. 13–26 illustrate one embodiment in which the location, symbol and altitude (such as presented above in connection with FIGS. 12A, 12B, 12C, 12D and 12E) are stored in a Custom 4 Field of a PDA address book entry. The embodiment represented in these figures maintain compatibility with conventional PDAs, such as Palm PDAs, and with conventional PDA desktop conduits. The present invention is not restricted to using a Custom 4 Field.

Figure 23:
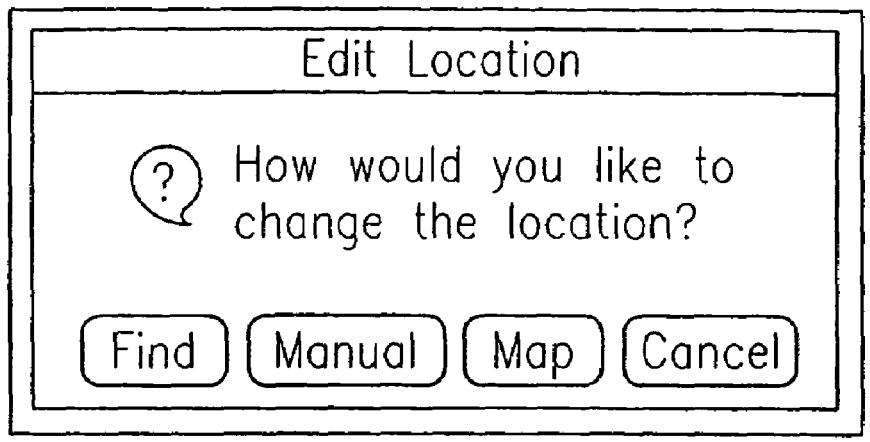
FIG. 23 is a representation of a Set/Edit Location Dialog Box for one PDA embodiment according to the present invention.

FIG. 13 is a representation of an Address List Screen for one PDA embodiment according to the present invention. The rightmost column contains a symbol 1312 if the address record has an associated location. If the address record already has a location, tapping this symbol centers a main map on the location associated with the address record. If the address record does not have a location, tapping the space where the symbol would otherwise be displays a Set Location Dialog Box, which is shown in FIG. 23.

FIG. 14 is a representation of an Address View Screen for one PDA embodiment according to the present invention. A "Location" button is present in place of a "New" button that is typically found in a conventional PDA address view screen. Tapping the Location button displays the Set Location Dialog Box, shown in FIG. 23, if this address record is not associated with a location, and displays an Address Location Form, shown in FIGS. 20 and 21, if this address record is associated with a location. The symbol, if any, associated with the record is displayed on the Address View screen. A menu item is available to delete locations associated with PDA address book entries.

FIG. 15 is a representation of custom fields (e.g. C1, C2, C3 and C4) for the Address View Screen of FIG. 14 when information exists in the Custom 4 Field that is not in a prescribed format to link to map data, such as that shown in FIGS. 12A–12E. As illustrated, the Custom 4 Field label and data is displayed if there is information in the Custom 4 Field that is not in the prescribed format to link to map data, such as that shown in FIGS. 12A–12E.

FIG. 16 is a representation of custom fields for the Address View Screen of FIG. 14 when no information exists in the Custom 4 Field or if the information is in a prescribed format to link to map data. As illustrated, the Custom 4 Field label and data are hidden if there is no information in the Custom 4 Field, or the information is in the prescribed format to link to map data, such as that shown in FIGS. 12A–12E.

Figure 17:
FIG. 17 is a representation of an Address Edit Screen for one PDA embodiment according to the present invention.

FIG. 17 is a representation of an Address Edit Screen for one PDA embodiment according to the present invention. The symbol, if any, associated with the record is displayed on the Address Edit Screen. A menu item is available to delete locations associated with PDA address book entries.

Figure 18:
FIG. 18 is a representation of custom fields for the Address Edit Screen of FIG. 17 when information exists in the Custom 4 Field that is not in a prescribed format.

FIG. 18 is a representation of custom fields for the Address Edit Screen of FIG. 17 when information exists in the Custom 4 Field that is not in a prescribed format to link to map data. As illustrated, the Custom 4 Field label and data is displayed if there is information in the Custom 4 Field that is not in the prescribed format to link to map data, such as that shown in FIGS. 12A–12E.

Figures 19, 20:
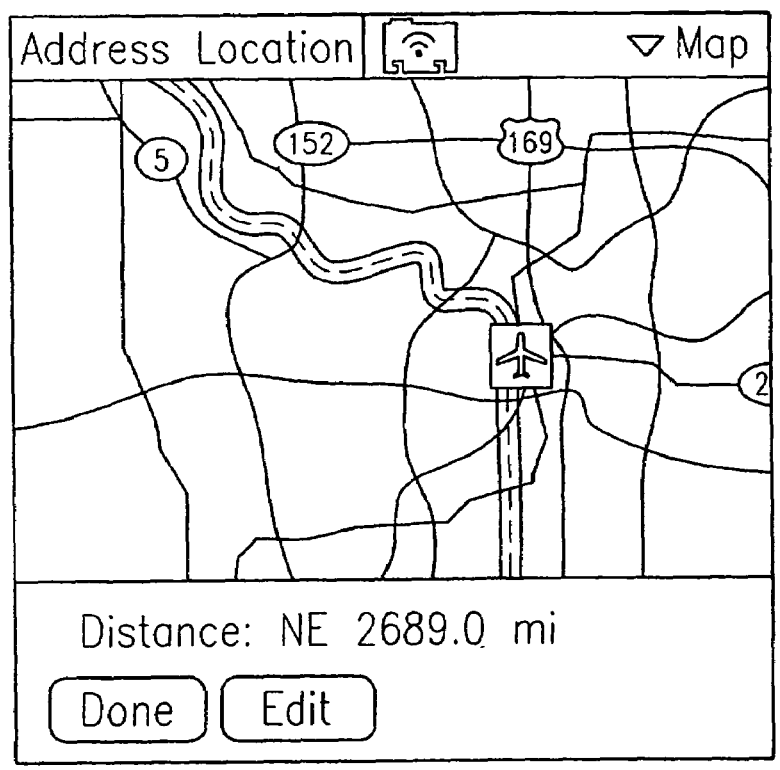
FIG. 19 is a representation of custom fields for the Address Edit Screen of FIG. 17 when no information exists in the Custom 4 Field or if the information is in a prescribed format.
FIG. 20 is a representation of a Map View for an Address Location Form for one PDA embodiment according to the present invention.

FIG. 19 is a representation of custom fields for the Address Edit Screen of FIG. 17 when no information exists in the Custom 4 Field or if the information is in a prescribed format to link to map data. As illustrated, the Custom 4 Field label and data are hidden if there is no information in the Custom 4 Field, or the information is in the prescribed format to link to map data, such as that shown in FIGS. 12A–12E.

According to this embodiment of the present invention, an Address Location Form is used to set and edit the location-related items of an address record. The Address Location Form is displayed when a Location button is tapped in the Address View Screen of FIG. 14, for example. The Address Location form has a Map View and a Details View.

FIG. 20 is a representation of a Map View for an Address Location Form for one PDA embodiment according to the present invention. The Map View is displayed the first time the Address Location Form is displayed after launching the address book. Selecting the Edit button displays the Address Edit Form for this address record. In one embodiment, such as shown in FIG. 20, the displayed map is centered on the location of the address record. The hardware up/down keys change the map zoom.

Figure 21:
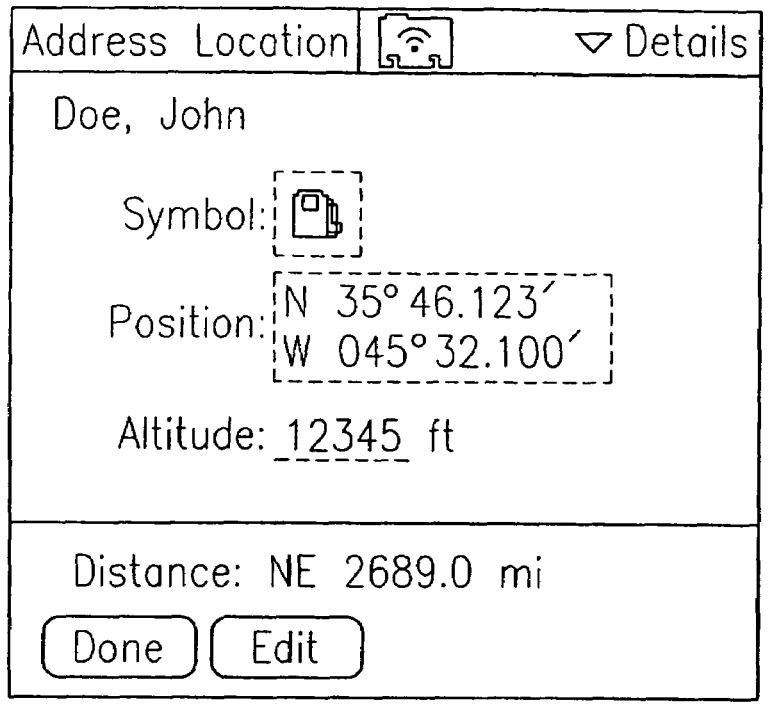
FIG. 21 is a representation of a Details View for an Address Location Form for one PDA embodiment according to the present invention.

FIG. 21 is a representation of a Details View for an Address Location Form for one PDA embodiment according to the present invention. The Details View displays and allows editing of the details of the location associated with a PDA Address Book Entry. Tapping the name or the Edit button displays the Address Edit Form for this address record.

Figure 22:
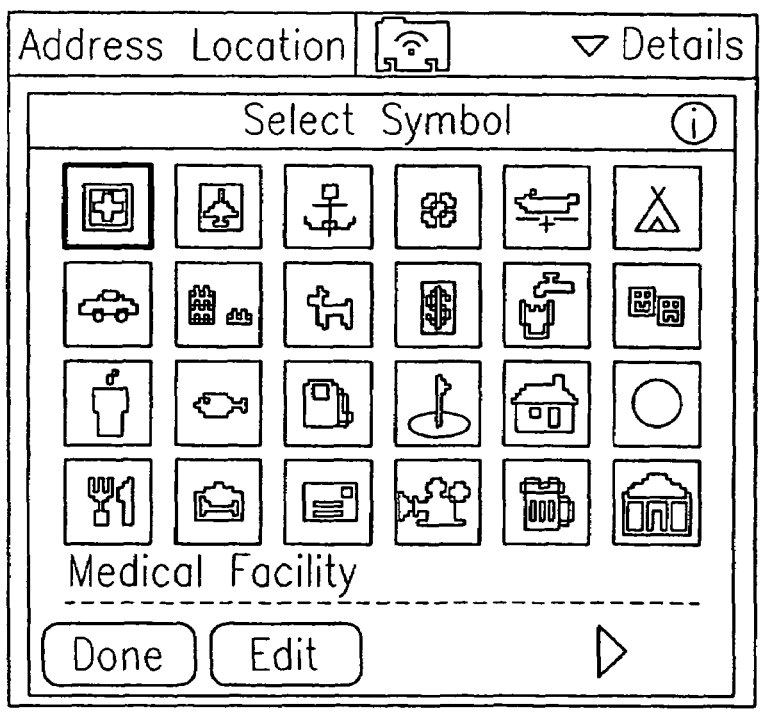
FIG. 22 is a representation of an Edit Symbol Screen for one PDA embodiment according to the present invention.

FIG. 22 is a representation of an Edit Symbol Screen for one PDA embodiment according to the present invention. Tapping a symbol highlights the symbol and displays its description. Tapping the scroll buttons displays next/previous pages of symbols. Tapping the OK button closes the dialog box and assigns the currently highlighted symbol to the address record. Tapping the cancel button closes the dialog box and keeps the current symbol.

In one embodiment, a Set/Edit Location Dialog Box is used to allow a user to choose the method for changing the location. The altitude is able to be edited in place as it is a standard numeric text field for a conventional PDA.

FIG. 23 is a representation of a Set/Edit Location Dialog Box for one PDA embodiment according to the present invention. This dialog box is able to be reached six ways in this embodiment. One way for reaching this dialog box is by tapping the space where the symbol would be from the Address List form, such as shown in FIG. 13, for an address record that does not have a location. In this instance, the title of the dialog box is Set Location. Another way for reaching this dialog box is by tapping the Location button from the Address View Form, such as shown in FIG. 14, for an address record that does not have a location. In this instance, the title is Set Location. Another way for reaching this dialog box is by tapping the location from the Details View of the Address Location Form, such as shown in FIG. 21. In this instance, the title is Edit Location. Other ways for reaching this dialog box uses menus in the Address View page, menus in the Address Edit page, and menus in the Address Location page. The text is set accordingly to reflect if it is a "Set" or "Edit."

A user is capable of editing the location using the Find button, the Manual button or the Map button. In one embodiment, tapping the Find button in the display of FIG. 23 displays the Find Address Form, which is populated with number, street, city and postal code fields from the address record.

Figure 24:
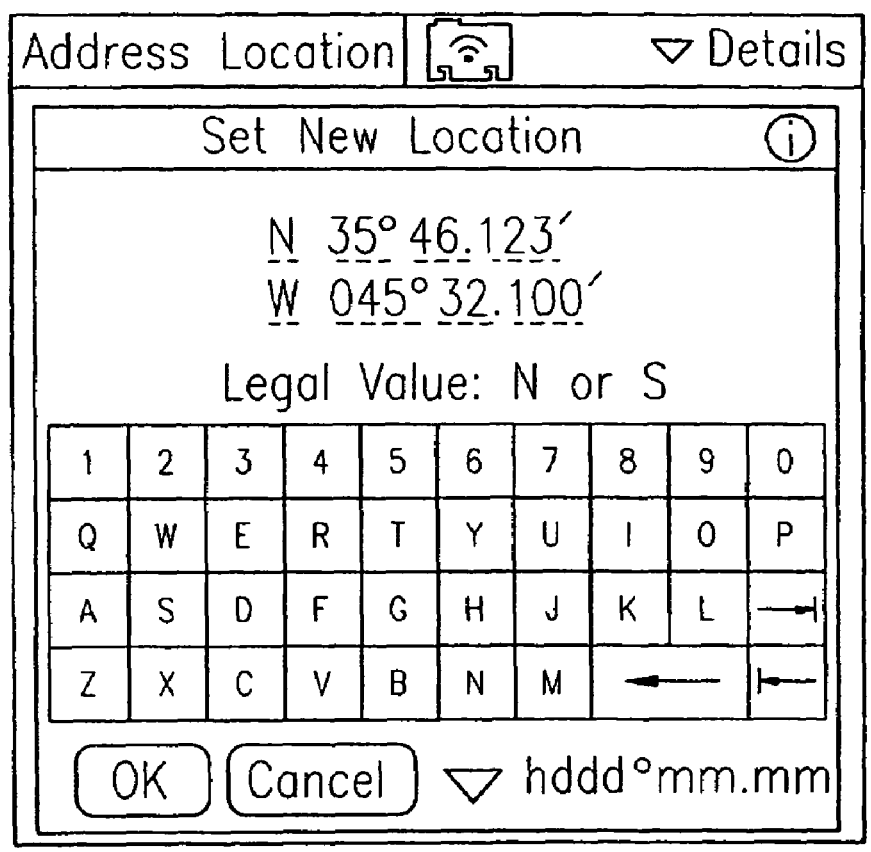
FIG. 24 is a representation of a screen for changing locations manually for one PDA embodiment according to the present invention.

FIG. 24 is a representation of a screen for changing locations manually for one PDA embodiment according to the present invention. Tapping the Manual button in the display of FIG. 23 displays the Set New Location dialog box, which allows the user to manually enter the location. Selecting user grid from the location format list displays a dialog box which allows the user to enter the user grid parameters.

Tapping the Map button in the display of FIG. 23 displays a map on which the user can tap to indicate the location to be used. This map includes a Checkmark and an X. Tapping the checkmark sets the location of the address record to the location indicated on the map. Tapping the X closes the map without changing the location of the address record.

Figure 25:
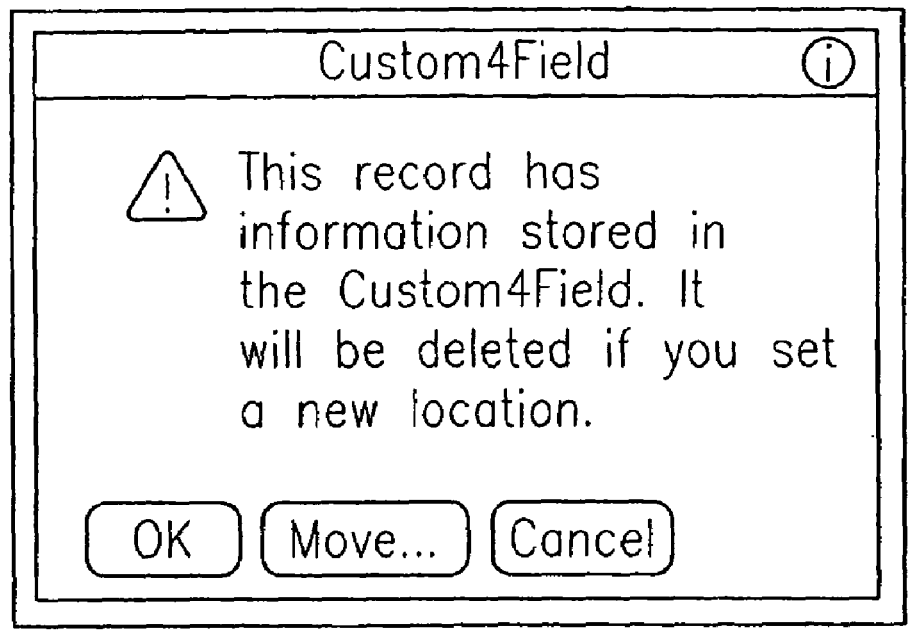
FIG. 25 is a representation of a notification box that the Custom 4 Field is in use according to one PDA embodiment according to the present invention.

FIG. 25 is a representation of a notification box that the Custom 4 Field is in use according to one PDA embodiment according to the present invention. In other words, the notification box indicates that the Custom 4 Field is storing data that is not in the prescribed format. Tapping the OK button associates a location by storing the location data string in the Custom 4 Field without first saving the Custom 4 Field data. Tapping the Cancel button cancels the pending association with a location. Tapping the Move button displays a dialog box that displays the beginning of the current Custom 4 Field data and allows a user to select a place to move the Custom 4 data.

Figure 26:
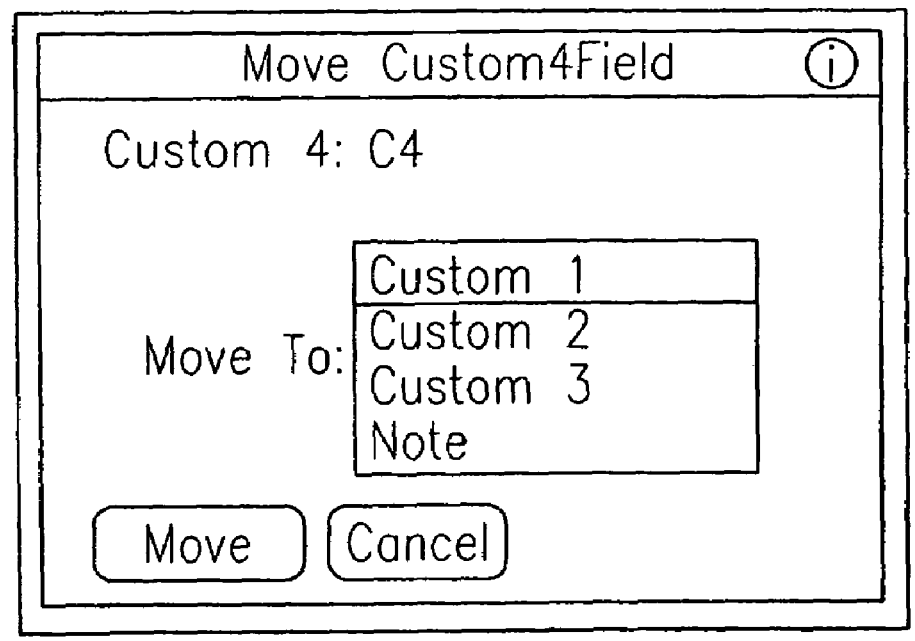
FIG. 26 is a representation of a Move Custom 4 Field box for one PDA embodiment according to the present invention.

FIG. 26 is a representation of a Move Custom 4 Field box for one PDA embodiment according to the present invention. This box is displayed after tapping the Move button in the display of FIG. 25. Any empty custom field is in the list Tapping one of the empty custom fields and tapping Move moves the data from the Custom 4 Field to the selected Custom Field. In one embodiment, the Note Field is always in the list. Tapping Note and then tapping Move creates a new note containing the data from the Custom 4 Field if a note does not currently exists, and appends the data from the Custom 4 Field to data in the note if the note already exists.

The present invention may also be described in the context of computer-executable instructions, such as program modules, being executed by a computer. Generally, program modules include routines, programs, objects, components, data structures, etc. that perform particular tasks or implement particular abstract data types.

As one of ordinary skill in the art will understand upon reading and comprehending this disclosure, any one or more of the above features can be combined into a particular embodiment of the invention. Likewise, in the invention any one or a combination of the above functions can be optionally de-activated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal that represents a sequence of instructions which, when executed by a processor, such as processor 236 in FIG. 2, cause the processor to perform the respective method. In other embodiments, methods provided above are implemented as a set of instructions contained on a computer-accessible medium, such as memory 242 in FIG. 2, capable of directing a processor, such as processor 236 in FIG. 2, to perform the respective method. In varying embodiments, the medium includes a magnetic medium, an electronic medium, or an optical medium.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to systems, devices and methods for integrating GPS receiver technology into a PDA. As such, the present invention allows electronic maps and GPS capabilities to be integrated with PDA functions. The present invention integrates PDA address book functions with an electronic map that has GPS capabilities.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A Personal Digital Assistant (PDA) device, comprising:
    means for storing and displaying a PDA address book entry, the PDA address book entry including an address;
    means for associating a location identifier with the PDA address book entry;
    means for accessing electronic map data;
    means for linking a location in the electronic map data with the location identifier associated with the PDA address book entry; and
    wherein the means for storing and displaying, associating, accessing, and linking all reside in the device, such that the device is not required to interact with an external apparatus in order to provide this functionality.

2. The device of claim 1, wherein the means for associating a location identifier with the PDA address book entry includes means for storing data representing coordinates with the PDA address book entry.

3. The device of claim 2, wherein the means for storing data representing coordinates with the PDA address book entry includes means for stating data representing a latitude and a longitude with the PDA address book entry.

4. The device of claim 1, wherein the means for storing and displaying the PDA address book entry and the means for associating the location identifier with the PDA address book entry includes means for allowing a user of the PDA to set a waypoint associated with a displayed PDA address book entry for the electronic map data.

5. The device of claim 4, wherein the displayed PDA address book entry includes an address view screen display on the PDA, and the means for allowing the user of the PDA to set the waypoint includes a button on the address view screen display.

6. The device of claim 4, wherein the displayed PDA address book entry includes an address edit screen display on the PDA, and the means for allowing the user of the PDA to set the waypoint includes a button on the address edit screen display.

7. The device of claim 4, wherein the means for allowing the user of the PDA to set the waypoint associated with the displayed PDA address book entry for the electronic map data includes means for allowing the user of the PDA to select a symbol for the waypoint to be displayed on an electronic map.

8. The device of claim 1, wherein the means for storing and displaying the PDA address book entry includes means for allowing a user of the PDA to display a map for a displayed PDA address book entry using the electronic map data.

9. The device of claim 8, wherein the displayed PDA address book entry includes an address list screen display on the PDA, and the means for allowing the user of the PDA to display a map for the displayed PDA address book entry includes a button on the address list screen display.

10. The device of claim 8, wherein the displayed PDA address book entry includes an address edit screen display on the PDA, and the means for allowing the user of the PDA to display the map for the displayed PDA address book entry includes a button on the address edit screen display.

11. The device of claim 1, wherein the means for storing and displaying the PDA address book entry includes means for allowing a user of the PDA to obtain a route from a present location of the PDA to the address of the PDA address book entry using the electronic map data.

12. The device of claim 11, wherein the means for allowing the user of the PDA to obtain the route from the present location of the PDA to the address of the PDA address book entry includes means for displaying the route on an electronic map.

13. The device of claim 11, wherein the displayed PDA address book entry includes an address list screen display on the PDA, and the means for displaying the route on the electronic map includes a button on the address list screen display.

14. The device of claim 11, wherein the displayed PDA address book entry includes an address edit screen display on the PDA, and the means for displaying the route on an electronic map includes a button on the address edit screen display.

15. The device of claim 1, wherein the means for accessing electronic map data includes a port on the PDA and an electronic map data cartridge to connect to the port.

16. The device of claim 1, wherein the means for accessing electronic map data includes receiving a wireless signal that transmits the electronic map data from a server to the PDA.

17. A personal digital assistant (PDA) device, comprising:
    a processor, and a memory to communicate with the processor;
    a Global Positioning System (GPS) antenna and a GPS receiver connected to the GPS antenna and the processor, the GPS receiver being adapted to determine a position of the PDA device;
    a touch-sensitive display screen connected to the processor;
    the memory including electronic map data, address book data, and computer readable instructions embedded in the memory to be operated on by the processor to:
        provide an electronic map application, the electronic map application being adapted to display an electronic map on the display screen, and provide the GPS-determined position of the PDA device on the electronic map;
        provide a PDA address book application, the PDA address book application being adapted to display an address book entry on the display screen and associate a location with the address book entry;
        link the electronic map application to the PDA address book application using the location associated with the address book entry.

18. The device of claim 17, wherein the location associated with the address book entry includes data representing coordinates associated with an address stored in the address book entry, the data being stored in a field of the address book entry.

19. The device of claim 18, wherein the field of the address book entry is further adapted to store a user-selectable symbol to be associated with the address in the address book entry for display on the electronic map.

20. The device of claim 18, wherein the coordinates include a longitude and a latitude associated with the address stored in the address book entry.

21. The device of claim 17, wherein the electronic map application includes a routing application, and the address book entry on the display screen of the PDA includes a button to display a route on the electronic map from the GPS-determined position of the PDA device to an address in the address book entry.

22. The device of claim 21, wherein the electronic map application further includes a guidance application to provide guidance when traveling a route generated by the routing application.

23. The device of claim 17, wherein the address book entry on the display screen of the PDA includes a button to display the electronic map on the display screen, the electronic map including a representation for an address in the address book entry.

24. The device of claim 17, wherein the address book entry on the display screen of the PDA includes a button to create a waypoint for display on the electronic map.

25. The device of claim 17, wherein the PDA address book application is adapted to pre-fill fields in an address book entry based on electronic map data.

26. The device of claim 25, wherein the PDA address book application is adapted to allow a user to edit pre-filled fields in the address book entry.

27. The device of claim 17, wherein the memory including electronic map data comprises a removable map data cartridge.

28. The device of claim 17, wherein the PDA is adapted to receive a wireless transmission signal to receive the electronic map data.

29. The device of claim 1, wherein the user selects the location from the electronic map data, the device resolves the location to coordinates, the device resolves the coordinates to the address, and the device populates the PDA address book entry with the address.

30. The device of claim 1, wherein the user selects the PDA address book entry, the device extracts the address from the PDA address book entry, the device resolves the address to coordinates, the device resolves the coordinates to the location, and the device displays the location using the electronic map data.

* * * * *